(12) United States Patent
Nikolayevich et al.

(10) Patent No.: US 10,133,494 B2
(45) Date of Patent: Nov. 20, 2018

(54) SYSTEM AND METHOD FOR PREDICTING MEMORY PERFORMANCE

(71) Applicant: EMC Corporation, Hopkinton, MA (US)

(72) Inventors: Alexeev Alexander Nikolayevich, Saint-Petersburg (RU); Anton Genadyevich Pegushin, Bellevue, WA (US); Rafikov Rustem Valeryevich, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 610 days.

(21) Appl. No.: 14/484,861

(22) Filed: Sep. 12, 2014

(65) Prior Publication Data

US 2015/0095606 A1 Apr. 2, 2015

(30) Foreign Application Priority Data

Sep. 30, 2013 (RU) .................................. 2013143925

(51) Int. Cl.
*G06F 12/00* (2006.01)
*G06F 3/06* (2006.01)
*G06F 9/46* (2006.01)

(52) U.S. Cl.
CPC .......... *G06F 3/0613* (2013.01); *G06F 3/0655* (2013.01); *G06F 3/0671* (2013.01); *G06F 9/467* (2013.01)

(58) Field of Classification Search
USPC ........................................................ 711/168
See application file for complete search history.

(56) References Cited

U.S. PATENT DOCUMENTS

2002/0166112 A1* 11/2002 Martin ................ G06F 11/3447
717/124
2009/0276758 A1 11/2009 Song et al.

OTHER PUBLICATIONS

Russian Office Action issued in counterpart Application Serial No. 2013143925 dated Mar. 30, 2016.

* cited by examiner

*Primary Examiner* — Sean D Rossiter
(74) *Attorney, Agent, or Firm* — Mark H. Whittenberger; Heath M. Sargeant; Holland & Knight LLP (57) ABSTRACT

A method, computer program product, and computing system for defining an optimal execution time (t) for a concurrent memory operation to be performed on a transactional memory system. An abort probability (p) is associated with the optimal execution time (t) based, at least in part, upon a probability curve. The probability curve is empirically derived and based upon the performance of the transactional memory system. A probable execution time ($T_{tm}$) is determined for the concurrent memory operation based, at least in part, upon the abort probability (p).

24 Claims, 4 Drawing Sheets

SYSTEM AND METHOD FOR PREDICTING MEMORY PERFORMANCE

RELATED APPLICATIONS

The subject application claims the priority of Russia Patent Application No. 2013143925, filed on 30 Sep. 2013, the contents of which are herein incorporated by reference in its entirety.

TECHNICAL FIELD

This disclosure relates to system design and, more particularly, to systems and methods that aid in system design.

BACKGROUND

Transactional memory has recently been made available in commodity hardware, wherein transactional memory promises many benefits and efficiency improvements in the area of concurrent execution of memory operations.

Unfortunately, the use of transactional memory has some downsides that may make its use actually result in reduced performance in JO intensive environments. Accordingly and when designing systems for use in JO intensive environments, tools and models may be utilized to help designers determine whether the use of transactional memory will help or hinder the performance of these transactional memory enabled device.

SUMMARY OF DISCLOSURE

In one implementation, a computer-implemented method includes defining an optimal execution time (t) for a concurrent memory operation to be performed on a transactional memory system. An abort probability (p) is associated with the optimal execution time (t) based, at least in part, upon a probability curve. The probability curve is empirically derived and based upon the performance of the transactional memory system. A probable execution time ($T_{tm}$) is determined for the concurrent memory operation based, at least in part, upon the abort probability (p).

One or more of the following features may be included. A concurrency level (c) may be defined for the transactional memory system. A serial execution time ($T_{cs}$) may be determined for the concurrent memory operation based, at least in part, upon: the optimal execution time (t) for the concurrent memory operation, and the concurrency level (c) of the transactional memory system. A performance boost indicator (B) may be determined for the concurrent memory operation based, at least in part, upon: the probable execution time ($T_{tm}$), and the serial execution time ($T_{cs}$) for the concurrent memory operation. An abort penalty (P) may be defined for the concurrent memory operation. An abort time ($T_{abort}$) may be determined based, at least in part, upon: the abort penalty (P) for the concurrent memory operation, the optimal execution time (t) for the concurrent memory operation, and the concurrency level (c) for the transactional memory system. The probable execution time ($T_{tm}$) for the concurrent memory operation may also be based, at least in part, upon: the optimal execution time (t) for the concurrent memory operation, the abort penalty (P) for the concurrent memory operation, and the concurrency level (c) of the transactional memory system. The transactional memory system may be included within a high availability storage system.

In another implementation, a computer program product resides on a computer readable medium that has a plurality of instructions stored on it. When executed by a processor, the instructions cause the processor to perform operations including defining an optimal execution time (t) for a concurrent memory operation to be performed on a transactional memory system. An abort probability (p) is associated with the optimal execution time (t) based, at least in part, upon a probability curve. The probability curve is empirically derived and based upon the performance of the transactional memory system. A probable execution time ($T_{tm}$) is determined for the concurrent memory operation based, at least in part, upon the abort probability (p).

One or more of the following features may be included. A concurrency level (c) may be defined for the transactional memory system. A serial execution time ($T_{cs}$) may be determined for the concurrent memory operation based, at least in part, upon: the optimal execution time (t) for the concurrent memory operation, and the concurrency level (c) of the transactional memory system. A performance boost indicator (B) may be determined for the concurrent memory operation based, at least in part, upon: the probable execution time ($T_{tm}$), and the serial execution time ($T_{cs}$) for the concurrent memory operation. An abort penalty (P) may be defined for the concurrent memory operation. An abort time ($T_{abort}$) may be determined based, at least in part, upon: the abort penalty (P) for the concurrent memory operation, the optimal execution time (t) for the concurrent memory operation, and the concurrency level (c) for the transactional memory system. The probable execution time ($T_{tm}$) for the concurrent memory operation may also be based, at least in part, upon: the optimal execution time (t) for the concurrent memory operation, the abort penalty (P) for the concurrent memory operation, and the concurrency level (c) of the transactional memory system. The transactional memory system may be included within a high availability storage system.

In another implementation, a computing system includes at least one processor and at least one memory architecture coupled with the at least one processor, wherein the computing system is configured to perform operations defining an optimal execution time (t) for a concurrent memory operation to be performed on a transactional memory system. An abort probability (p) is associated with the optimal execution time (t) based, at least in part, upon a probability curve. The probability curve is empirically derived and based upon the performance of the transactional memory system. A probable execution time ($T_{tm}$) is determined for the concurrent memory operation based, at least in part, upon the abort probability (p).

One or more of the following features may be included. A concurrency level (c) may be defined for the transactional memory system. A serial execution time ($T_{cs}$) may be determined for the concurrent memory operation based, at least in part, upon: the optimal execution time (t) for the concurrent memory operation, and the concurrency level (c) of the transactional memory system. A performance boost indicator (B) may be determined for the concurrent memory operation based, at least in part, upon: the probable execution time ($T_{tm}$), and the serial execution time ($T_{cs}$) for the concurrent memory operation. An abort penalty (P) may be defined for the concurrent memory operation. An abort time ($T_{abort}$) may be determined based, at least in part, upon: the abort penalty (P) for the concurrent memory operation, the optimal execution time (t) for the concurrent memory operation, and the concurrency level (c) for the transactional memory system. The probable execution time ($T_{tm}$) for the concurrent memory operation may also be based, at least in part, upon: the optimal execution time (t) for the concurrent memory operation, the abort penalty (P) for the concurrent memory operation, and the concurrency level (c) of the transactional memory system. The transactional memory system may be included within a high availability storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
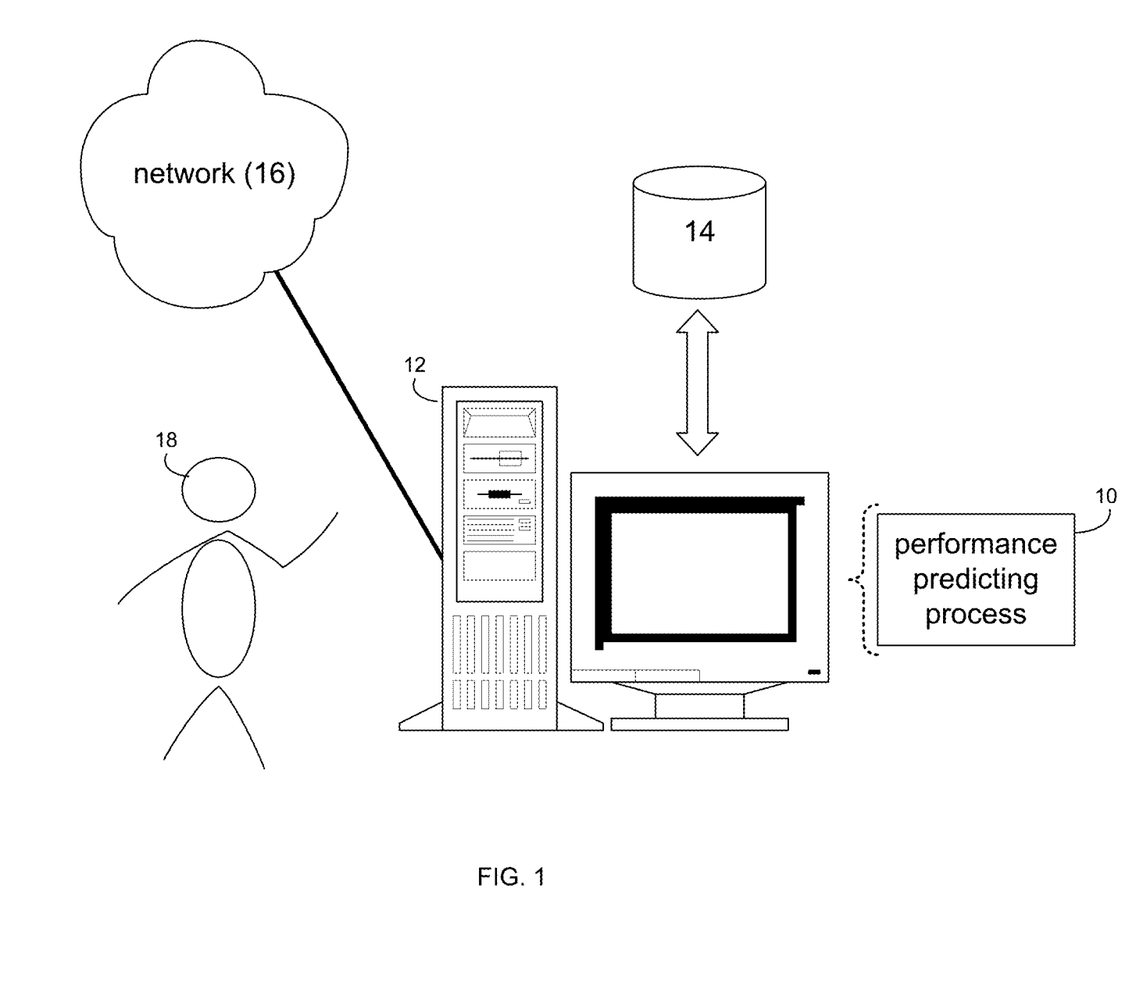
FIG. 1 is a diagrammatic view of a computing system and a performance predicting process configured to execute on the computing system.
Figure 2:
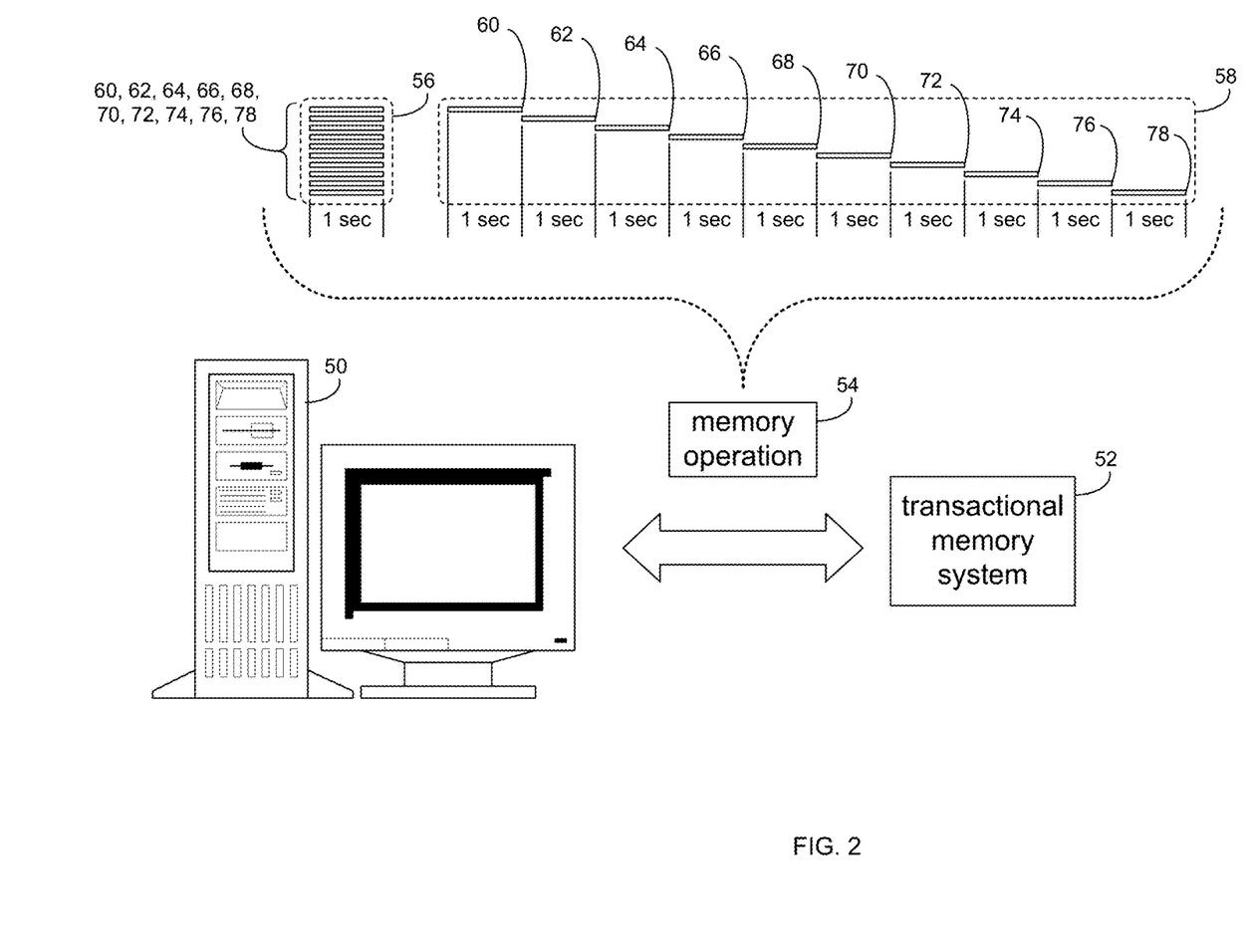
FIG. 2 is a diagrammatic view of a computing system, a transactional memory system, and various memory operations.
Figure 3:
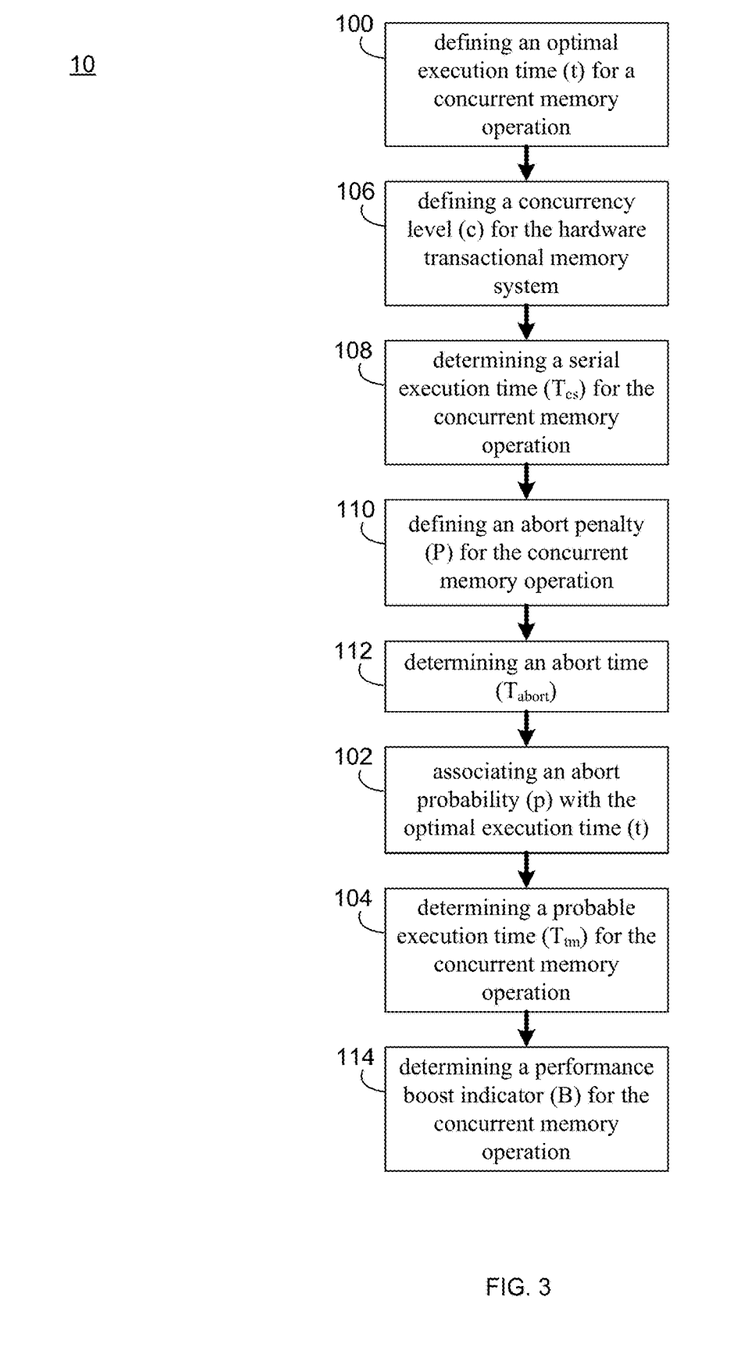
FIG. 3 is a flow chart of the performance predicting process of FIG. 1.

System Overview:

Referring to FIGS. 1-3, there is shown performance predicting process 10 that may reside on and may be executed by computing device 12. Examples of computing device 12 may include, but are not limited to: a personal computer, a laptop computer, a personal digital assistant, a data-enabled cellular telephone, a notebook computer, a server computer, a series of server computers, a mini computer, or a mainframe computer.

The instruction sets and subroutines of performance predicting process 10, which may be stored on storage device 14 coupled to computing device 12, may be executed by one or more processors (not shown) and one or more memory architectures (not shown) included within computing device 12. Examples of storage device 14 may include but are not limited to: a hard disk drive; a tape drive; an optical drive; a RAID device; a random access memory (RAM); a read-only memory (ROM); and all forms of flash memory storage devices. Computing device 12 may be coupled to network 16 (e.g., the Internet, a local area network, a wide area network), thus allowing computing device 12 and/or performance predicting process 10 to communicate with other computing devices (not shown) that may be coupled to network 16.

As will be discussed below in greater detail, performance predicting process 10 may define 100 an optimal execution time (t) for a concurrent memory operation to be performed on a transactional memory system. Performance predicting process 10 may associate 102 an abort probability (p) with the optimal execution time (t) based, at least in part, upon a probability curve, wherein the probability curve is empirically derived and based upon the performance of the transactional memory system. Performance predicting process 10 may determine 104 a probable execution time ($T_{tm}$) for the concurrent memory operation based, at least in part, upon the abort probability (p).

Performance predicting process 10 may be configured to assist a user (e.g., user 18) in designing computing device 50. Specifically, performance predicting process 10 may be configured to predict the manner in which transactional memory system 52 within computing device 50 may respond to memory operation 54. Examples of computing device 50 may include but are not limited to the various components of high-availability storage systems, such as: server systems, disk array systems, storage processor systems, storage processor/disk systems, and battery backup systems. Examples of memory operation 54 may include concurrent memory operations (e.g., concurrent memory operation 56) and serial memory operations (e.g., serial memory operation 58).

As discussed above, transactional memory systems (e.g., transactional memory system 52) are appearing in commodity hardware (such as computing device 50), wherein transactional memory system 52 may provide benefits and efficiency improvements when processing concurrent memory operations (e.g., concurrent memory operation 56). Transactional memory system 52 may also process serial memory operations (e.g., serial memory operation 58). However, the above-mentioned efficiencies (which will be discussed below in greater detail) may not be realized when processing such serial memory operations (e.g., serial memory operation 58). Further and as discussed above, the use of transactional memory systems 52 and the processing of concurrent memory operations (e.g., concurrent memory operation 56) may have some downsides that may make the processing of concurrent memory operations (e.g., concurrent memory operation 56) by transactional memory system 52 less efficient than the processing of serial memory operations (e.g., serial memory operation 58).

For example, assume that concurrent memory operation 56 is intended to represent a concurrent form of memory operation 54; while serial memory operation 58 is intended to represent a serial form of memory operation 54. Assume for illustrative purposes that memory operation 54 (and, therefore, concurrent memory operation 56 and serial memory operation 58) includes a plurality of ten tasks, namely tasks 60, 62, 64, 66, 68, 70, 72, 74, 76, 78. Further assume for illustrative purposes that each of tasks 60, 62, 64, 66, 68, 70, 72, 74, 76, 78 has an execution time of one-second. Accordingly, computing device 50 may process any of tasks 60, 62, 64, 66, 68, 70, 72, 74, 76, 78 in one-second.

When memory operation 54 is configured as concurrent memory operation 56, transactional memory system 52 may process tasks 60, 62, 64, 66, 68, 70, 72, 74, 76, 78 in a concurrent/simultaneous fashion. Accordingly, transactional memory system 52 may concurrently/simultaneously process all of tasks 60, 62, 64, 66, 68, 70, 72, 74, 76, 78 at the same time and in one-second. Conversely, when memory operation 54 is configured as serial memory operation 58, transactional memory system 52 may process tasks 60, 62, 64, 66, 68, 70, 72, 74, 76, 78 in a serial/sequential fashion. Accordingly, transactional memory system 52 may serially/sequentially process tasks 60, 62, 64, 66, 68, 70, 72, 74, 76, 78 over the course of ten-seconds (i.e., one-second for each of tasks 60, 62, 64, 66, 68, 70, 72, 74, 76, 78).

Accordingly, if memory operation 54 is configured as concurrent memory operation 56, tasks 60, 62, 64, 66, 68, 70, 72, 74, 76, 78 may be processed concurrently and in one-second (as opposed to serially and in ten-seconds when memory operation 54 is configured as serial memory operation 58), thus resulting in a 90% reduction in processing time by transactional memory system 52. However and as discussed above, the use of transactional memory system 52 and concurrent memory operations (e.g., concurrent memory operation 56) have downsides that may make their use result in reduced performance in IO intensive environments (e.g., server systems, disk array systems, storage processor systems, storage processor/disk systems, and battery backup systems). Specifically, since transactional memory system 52 concurrently/simultaneously processes tasks 60, 62, 64, 66, 68, 70, 72, 74, 76, 78 within concurrent memory operation 56 and does not lock memory spaces/addresses when processing these tasks, data corruption is possible. For example, two or more of tasks 60, 62, 64, 66, 68, 70, 72, 74, 76, 78 may attempt to utilize the same memory address space, resulting in needed data being overwritten and, therefore, data corruption. Transactional memory system 52 may monitor the specific address spaces written to and, in the event that two or more of tasks 60, 62, 64, 66, 68, 70, 72, 74, 76, 78 write data to the same memory address space: an interrupt may be triggered, the processing of concurrent memory operation 56 may be cancelled (resulting in lost processing time), and the individual tasks (e.g., tasks 60, 62, 64, 66, 68, 70, 72, 74, 76, 78) within concurrent memory operation 56 may be processed serially (in a manner similar to serial memory operation 58). Further, there may be processing overhead associated with initiating and cancelling the concurrent/simultaneous processing of tasks 60, 62, 64, 66, 68, 70, 72, 74, 76, 78, which may be referred to as an abort penalty (P) for concurrent memory operation 56.

Further, since the individual tasks (e.g., tasks 60, 62, 64, 66, 68, 70, 72, 74, 76, 78) within serial memory operation 58 are not processed concurrently and are only processed serially, two or more of tasks 60, 62, 64, 66, 68, 70, 72, 74, 76, 78 may never write to the same memory address space, resulting in the avoidance of interrupts.

Performance Predicting Process:

As discussed above, performance predicting process 10 may be configured to assist a user (e.g., user 18) in designing computing device 50, wherein performance predicting process 10 may be configured to predict the manner in which transactional memory system 52 within computing device 50 may respond to memory operation 54.

Performance predicting process 10 may define 100 an optimal execution time (t) for a concurrent memory operation (e.g., concurrent memory operation 56) to be performed on transactional memory system 52. As used in this disclosure, an example of concurrent memory operation 56 may include but is not limited to any set of CPU instructions that may be run concurrently and may include (among other things) read memory operations and write memory operations.

Optimal execution time (t) may be the least amount of time required by transactional memory system 52 to process concurrent memory operation 56. As discussed above, transactional memory system 52 may concurrently/simultaneously process all of tasks 60, 62, 64, 66, 68, 70, 72, 74, 76, 78 at the same time and in one-second. Accordingly and in this example, performance predicting process 10 may define 100 (in response to an input by user 18) optimal execution time (t) for concurrent memory operation 56 as 1.00 seconds.

Performance predicting process 10 may define 106 a concurrency level (c) for transactional memory system 52. Concurrency level (c) may refer to the number of tasks that may be included within concurrent memory operation 56 and concurrently/simultaneously processed by transactional memory system 52 and one or more CPUs included within computing device 50. As discussed above and in this example, concurrent memory operation 56 is shown to include ten tasks, namely tasks 60, 62, 64, 66, 68, 70, 72, 74, 76, 78. Accordingly, performance predicting process 10 may define 106 (in response to an input by user 18) a concurrency level (c) of 10.00 for transactional memory system 52.

As discussed above, transactional memory system 52 may monitor the specific address spaces written to when processing concurrent memory operation 56. In the event that two or more of tasks 60, 62, 64, 66, 68, 70, 72, 74, 76, 78 write to the same memory address space, the processing of concurrent memory operation 56 may be cancelled (resulting in lost processing time) and the individual tasks (e.g., tasks 60, 62, 64, 66, 68, 70, 72, 74, 76, 78) within memory operation 56 may be processed serially (in a manner similar to serial memory operation 58).

Accordingly, performance predicting process 10 may determine 108 a serial execution time ($T_{cs}$) for concurrent memory operation 56 based, at least in part, upon: optimal execution time (t) for concurrent memory operation 56, and concurrency level (c) of transactional memory system 56; in accordance with the following formula:

$$T_{cs}=t*c$$

$$T_{cs}=1.00*10.00$$

Therefore, performance predicting process 10 may determine 108 a serial execution time ($T_{cs}$) of 10.00 seconds for concurrent memory operation 56.

As discussed above, there may be processing overhead associated with initiating & cancelling the concurrent/simultaneous processing of tasks 60, 62, 64, 66, 68, 70, 72, 74, 76, 78, (and any recovery), which may be referred to as abort penalty (P) for concurrent memory operation 56. Performance predicting process 10 may define 110 (in response to an input by user 18) an abort penalty (P) for concurrent memory operation 56. For illustrative purposes only, assume that it takes 1.00 second to initiate the concurrent/simultaneous processing of tasks 60, 62, 64, 66, 68, 70, 72, 74, 76, 78 and 1.00 seconds to cancel the concurrent/simultaneous processing of tasks 60, 62, 64, 66, 68, 70, 72, 74, 76, 78. Accordingly, performance predicting process 10 may define 110 an abort penalty (P) of 2.00 seconds for concurrent memory operation 56, which may be applied if the execution of concurrent memory operation 56 is interrupted and aborted.

Performance predicting process 10 may determine 112 an abort time ($T_{abort}$) based, at least in part, upon: the abort penalty (P) for the concurrent memory operation, the optimal execution time (t) for the concurrent memory operation, and the concurrency level (c) for the transactional memory system; in accordance with the following formula:

$$T_{abort}=t+P+T_{cs}$$

$$T_{abort}=t+P+(t*c)$$

$$T_{abort}=1.00+2.00+(1.00*10.00)$$

Therefore, performance predicting process 10 may determine 112 an abort time ($T_{abort}$) of 13.00 seconds for concurrent memory operation 56.

Figure 4:
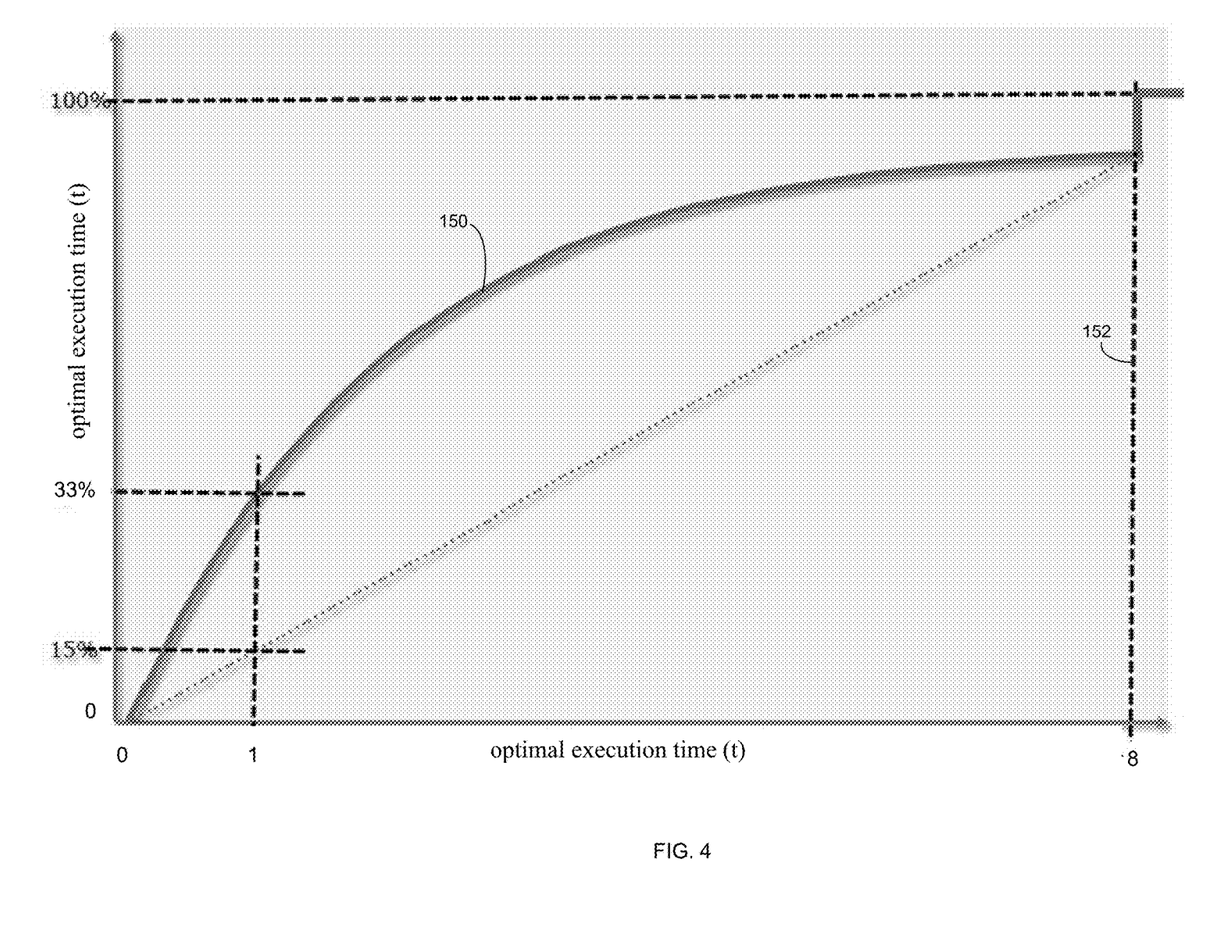
FIG. 4 is a diagrammatic view of a probability curve for use by the performance predicting process of FIG. 1.

Referring also to FIG. 4, performance predicting process 10 may associate 102 an abort probability (p) with the optimal execution time (t) based, at least in part, upon a probability curve (e.g., probability curve 150), wherein probability curve 150 may be empirically derived and based upon the performance of transactional memory system 52 (in response to processing concurrent memory operations, such as concurrent memory operation 56). For the purposes of this disclosure, abort probability (p) is intended to mean the probability that the execution of a concurrent memory operation within a memory transaction may be aborted during the execution of the same due to e.g., the occurrence of an interrupt.

As discussed above, in the event that an interrupt is triggered, the processing of concurrent memory operation 56 may be cancelled (resulting in lost processing time) and the individual tasks (e.g., tasks 60, 62, 64, 66, 68, 70, 72, 74, 76, 78) within concurrent memory operation 56 may be processed serially. Accordingly, the avoidance of the triggering of interrupts within transactional memory system 52 may result in an improvement in the performance of transactional memory system 52. Specifically, if the interrupt rate is close to the optimal execution time (t) (e.g., the amount of time required to process concurrent memory operation 56), interrupts may become that major reason for transaction aborts (e.g., performance predicting process 10 switching from concurrent processing to serial processing of tasks 60, 62, 64, 66, 68, 70, 72, 74, 76, 78).

As discussed above, probability curve 150 may be empirically derived by e.g., user 18 testing the operation of computing device 50 and transactional memory system 52. The x-axis of probability curve 150 may refer to the length of optimal execution time (t), which is the amount of time required to process concurrent memory operation 56. Accordingly, the longer the length of optimal execution time (t), the more likely it is that an interrupt will occur and the processing of concurrent memory operation 56 will be aborted (and processed serially). Further, there are points during the operation of transactional memory system 52 that mandatory interrupts will occur (e.g., during context switches). These mandatory interrupts may occur at defined intervals. For illustrative purposes only, assume that every 8.00 seconds an interrupt occurs within transactional memory system 52 (e.g., due to a context switch). Accordingly, once optimal execution time (t) reaches 8.00 seconds, there is a 100% certainty that an interrupt will occur, aborting the processing of concurrent memory operation 56 (which is why probability curve 150 become vertical at point 152 along the x-axis).

Probability curve 150 may be generated using a Poisson exponential distribution function, such as the Cumulative Distribution Function:

$$1 - e^{-\lambda x}$$

wherein the value of lambda may be determined empirically to adjust the rate at which probability curve 150 asymptotically approaches 100% on the Y-axis (prior to reaching point 152) in accordance with the following equations:

$$\hat{\lambda} = \frac{1}{\bar{x}}, \text{ wherein}$$

$$\bar{x} = \frac{1}{n}\sum_{i=1}^{n} x_i$$

Assume for illustrative purposes that (based upon probability curve 150), performance predicting process 10 associates 102 an abort probability (p) of 33% for an optimal execution time (t) of 1.00 seconds.

Performance predicting process 10 may determine 104 a probable execution time ($T_{tm}$) for concurrent memory operation 56 based, at least in part, upon the abort probability (p), optimal execution time (t) for concurrent memory operation 56, abort penalty (P) for concurrent memory operation 56, and concurrency level (c) of transactional memory system 52; in accordance with the following formula:

$$T_{tm} = (1-p)t + p(T_{abort})$$

$$T_{tm} = (1-0.33)1.00 + 0.33(1.00 + 2.00 + (1.00 * 10.00))$$

$$T_{tm} = (0.67)1.00 + 0.33(13.00)$$

$$T_{tm} = 4.96$$

Performance predicting process 10 may then determining 106 a performance boost indicator (B) for concurrent memory operation 56 based, at least in part, upon: probable execution time ($T_{tm}$), and the serial execution time ($T_{cs}$) for concurrent memory operation 56; in accordance with the following formula:

$$B = \text{abs}(T_{tm} - T_{cs})/T_{cs}$$

$$B = \text{abs}(4.96 - 10.00)/10.00$$

$$B = \text{abs}(-5.04)/10.00$$

$$B = 50.4\%$$

Accordingly and through the use of performance predicting process 10, it is determined 106 that the computational workload of processing concurrent memory operation 56 is reduced by 50.4% through the use of concurrent processing. Accordingly, user 18 may consider this performance boost indicator (B) when deciding whether to implement transaction memory system 52 (as opposed to a traditional memory system) into computing device 52.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
defining, using one or more processors, an optimal execution time (t) for a concurrent memory operation to be performed on a transactional memory system;
associating, using the one or more processors, an abort probability (p) with the optimal execution time (t) based, at least in part, upon a probability curve, wherein the probability curve is empirically derived and based upon the performance of the transactional memory system; and
determining, the using one or more processors, a probable execution time ($T_{tm}$) for the concurrent memory operation based, at least in part, upon the abort probability (p).

2. The computer-implemented method of claim 1 further comprising:
defining a concurrency level (c) for the transactional memory system.

3. The computer-implemented method of claim 2 further comprising:
determining a serial execution time ($T_{cs}$) for the concurrent memory operation based, at least in part, upon:

the optimal execution time (t) for the concurrent memory operation, and
the concurrency level (c) of the transactional memory system.

4. The computer-implemented method of claim 3 further comprising:
determining a performance boost indicator (B) for the concurrent memory operation based, at least in part, upon:
the probable execution time ($T_{tm}$), and
the serial execution time ($T_{cs}$) for the concurrent memory operation.

5. The computer-implemented method of claim 2 further comprising:
defining an abort penalty (P) for the concurrent memory operation.

6. The computer-implemented method of claim 5 further comprising:
determining an abort time ($T_{abort}$) based, at least in part, upon:
the abort penalty (P) for the concurrent memory operation,
the optimal execution time (t) for the concurrent memory operation, and
the concurrency level (c) for the transactional memory system.

7. The computer-implemented method of claim 5 wherein the probable execution time ($T_{tm}$) for the concurrent memory operation is also based, at least in part, upon:
the optimal execution time (t) for the concurrent memory operation,
the abort penalty (P) for the concurrent memory operation, and
the concurrency level (c) of the transactional memory system.

8. The computer-implemented method of claim 1 wherein the transactional memory system is included within a high availability storage system.

9. A computer program product residing on a non-transitory computer readable medium having a plurality of instructions stored thereon which, when executed by a processor, cause the processor to perform operations comprising:
defining an optimal execution time (t) for a concurrent memory operation to be performed on a transactional memory system;
associating an abort probability (p) with the optimal execution time (t) based, at least in part, upon a probability curve, wherein the probability curve is empirically derived and based upon the performance of the transactional memory system; and
determining a probable execution time ($T_{tm}$) for the concurrent memory operation based, at least in part, upon the abort probability (p).

10. The computer program product of claim 9 further comprising instructions for:
defining a concurrency level (c) for the transactional memory system.

11. The computer program product of claim 10 further comprising instructions for:
determining a serial execution time ($T_{cs}$) for the concurrent memory operation based, at least in part, upon:
the optimal execution time (t) for the concurrent memory operation, and
the concurrency level (c) of the transactional memory system.

12. The computer program product of claim 11 further comprising instructions for:
determining a performance boost indicator (B) for the concurrent memory operation based, at least in part, upon:
the probable execution time ($T_{tm}$), and
the serial execution time ($T_{cs}$) for the concurrent memory operation.

13. The computer program product of claim 10 further comprising instructions for:
defining an abort penalty (P) for the concurrent memory operation.

14. The computer program product of claim 13 further comprising instructions for:
determining an abort time ($T_{abort}$) based, at least in part, upon:
the abort penalty (P) for the concurrent memory operation,
the optimal execution time (t) for the concurrent memory operation, and
the concurrency level (c) for the transactional memory system.

15. The computer program product of claim 13 wherein the probable execution time ($T_{tm}$) for the concurrent memory operation is also based, at least in part, upon:
the optimal execution time (t) for the concurrent memory operation,
the abort penalty (P) for the concurrent memory operation, and
the concurrency level (c) of the transactional memory system.

16. The computer program product of claim 9 wherein the transactional memory system is included within a high availability storage system.

17. A computing system including at least one processor and at least one memory architecture coupled with the at least one processor, wherein the computing system is configured to perform operations comprising:
defining an optimal execution time (t) for a concurrent memory operation to be performed on a transactional memory system;
associating an abort probability (p) with the optimal execution time (t) based, at least in part, upon a probability curve, wherein the probability curve is empirically derived and based upon the performance of the transactional memory system; and
determining a probable execution time ($T_{tm}$) for the concurrent memory operation based, at least in part, upon the abort probability (p).

18. The computing system of claim 17 further configured to perform operations comprising:
defining a concurrency level (c) for the transactional memory system.

19. The computing system of claim 18 further configured to perform operations comprising:
determining a serial execution time ($T_{cs}$) for the concurrent memory operation based, at least in part, upon:
the optimal execution time (t) for the concurrent memory operation, and
the concurrency level (c) of the transactional memory system.

20. The computing system of claim 19 further configured to perform operations comprising:
determining a performance boost indicator (B) for the concurrent memory operation based, at least in part, upon:

the probable execution time ($T_{tm}$), and the serial execution time ($T_{cs}$) for the concurrent memory operation.

21. The computing system of claim 18 further configured to perform operations comprising:

defining an abort penalty (P) for the concurrent memory operation.

22. The computing system of claim 21 further configured to perform operations comprising:

determining an abort time ($T_{abort}$) based, at least in part, upon:

the abort penalty (P) for the concurrent memory operation, the optimal execution time (t) for the concurrent memory operation, and the concurrency level (c) for the transactional memory system.

23. The computing system of claim 21 wherein the probable execution time ($T_{tm}$) for the concurrent memory operation is also based, at least in part, upon:

the optimal execution time (t) for the concurrent memory operation, the abort penalty (P) for the concurrent memory operation, and the concurrency level (c) of the transactional memory system.

24. The computing system of claim 17 wherein the transactional memory system is included within a high availability storage system.

* * * * *